US012651100B2

(12) United States Patent
Zeng et al.

(10) Patent No.: US 12,651,100 B2
(45) Date of Patent: Jun. 9, 2026

(54) GENERATING SUPPORTS

(71) Applicants: Peridot Print LLC, Palo Alto, CA (US); Instituto Atlântico, Fortaleza (BR)

(72) Inventors: Jun Zeng, Palo Alto, CA (US); Paulo Bruno Serafim, Porto Alegre (BR); Alyne Gomes Soares Cantal, Porto Alegre (BR)

(73) Assignee: Peridot Print LLC, Palo Alto, CA (US)

( * ) Notice: Subject to any disclaimer, the term of this patent is extended or adjusted under 35 U.S.C. 154(b) by 825 days.

(21) Appl. No.: 17/774,805

(22) PCT Filed: Nov. 25, 2019

(86) PCT No.: PCT/US2019/063035
§ 371 (c)(1),
(2) Date: May 5, 2022

(87) PCT Pub. No.: WO2021/107916
PCT Pub. Date: Jun. 3, 2021

(65) Prior Publication Data
US 2022/0379379 A1      Dec. 1, 2022

(51) Int. Cl.
| | |
|---|---|
| *B33Y 50/00* | (2015.01) |
| *B22F 10/38* | (2021.01) |
| *B22F 10/47* | (2021.01) |
| *G05B 19/4099* | (2006.01) |
| *G06F 30/10* | (2020.01) |
| *G06F 30/20* | (2020.01) |

(Continued)

(52) U.S. Cl.
CPC .............. *G06F 30/20* (2020.01); *B22F 10/47* (2021.01); *B33Y 50/00* (2014.12); *G05B 19/4099* (2013.01); *G06F 30/10* (2020.01); *B22F 10/20* (2021.01); *B22F 10/385* (2021.01); *B22F 10/80* (2021.01); *G05B 2219/49041* (2013.01); *G06F 2113/10* (2020.01)

(58) Field of Classification Search
CPC ...... G06F 30/20; G06F 30/10; G06F 2113/10; B22F 10/47; B22F 10/20; B22F 10/385; B22F 10/80; B33Y 50/00; G05B 19/4099; G05B 2219/49041; Y02P 10/25; B29C 64/40; B29C 64/386
See application file for complete search history.

(56) References Cited

U.S. PATENT DOCUMENTS

| | | | |
|---|---|---|---|
| 9,688,024 B2 | 6/2017 | Stava | |
| 9,844,917 B2 | 12/2017 | Burhop et al. | |

(Continued)

FOREIGN PATENT DOCUMENTS

| | | |
|---|---|---|
| CN | 109624326 A | 4/2019 |
| WO | 2017/147412 A1 | 8/2017 |
| WO | 2018/017082 A1 | 1/2018 |

*Primary Examiner* — Kenneth M Lo
*Assistant Examiner* — Mohammed Shafayet
(74) *Attorney, Agent, or Firm* — Michael Dryja

(57) ABSTRACT

Examples of methods for generating supports are described herein. In some examples, a method includes determining a starting position from a set of voxels of a three-dimensional (3D) object model to be additively manufactured. In some examples, the method also includes generating a support for the 3D object model by traversing a cost field from the starting position.

18 Claims, 7 Drawing Sheets

(51) Int. Cl.
*G06F 113/10* (2020.01)
*B22F 10/20* (2021.01)
*B22F 10/80* (2021.01)

(56) References Cited

U.S. PATENT DOCUMENTS

| | | | |
|---|---|---|---|
| 10,384,263 B2 | 8/2019 | Craeghs et al. | |
| 2009/0072447 A1* | 3/2009 | Hull | B29C 64/40 |
| | | | 264/401 |
| 2014/0303942 A1* | 10/2014 | Wighton | B29C 33/3842 |
| | | | 703/1 |
| 2015/0066178 A1* | 3/2015 | Stava | B22F 10/47 |
| | | | 700/98 |
| 2015/0360421 A1* | 12/2015 | Burhop | G05B 19/4097 |
| | | | 700/98 |
| 2017/0176979 A1 | 6/2017 | Lalish et al. | |
| 2018/0056594 A1 | 3/2018 | Sterenthal et al. | |
| 2018/0065311 A1 | 3/2018 | Lefebvre et al. | |
| 2018/0111320 A1* | 4/2018 | Zhao | B29C 64/393 |
| 2018/0311897 A1 | 11/2018 | Arnon et al. | |
| 2018/0373227 A1* | 12/2018 | Sadusk | H04N 1/00676 |
| 2020/0111265 A1* | 4/2020 | Johansson | G06T 5/30 |
| 2020/0122402 A1* | 4/2020 | Yang | G06F 30/20 |

* cited by examiner

100

102

Determining a starting position from a set of voxels of a 3D object model to be additively manufactured

104

Generate a support for the 3D object model by traversing a cost field from the starting position Computer-Readable Medium _442_

Figure 4:
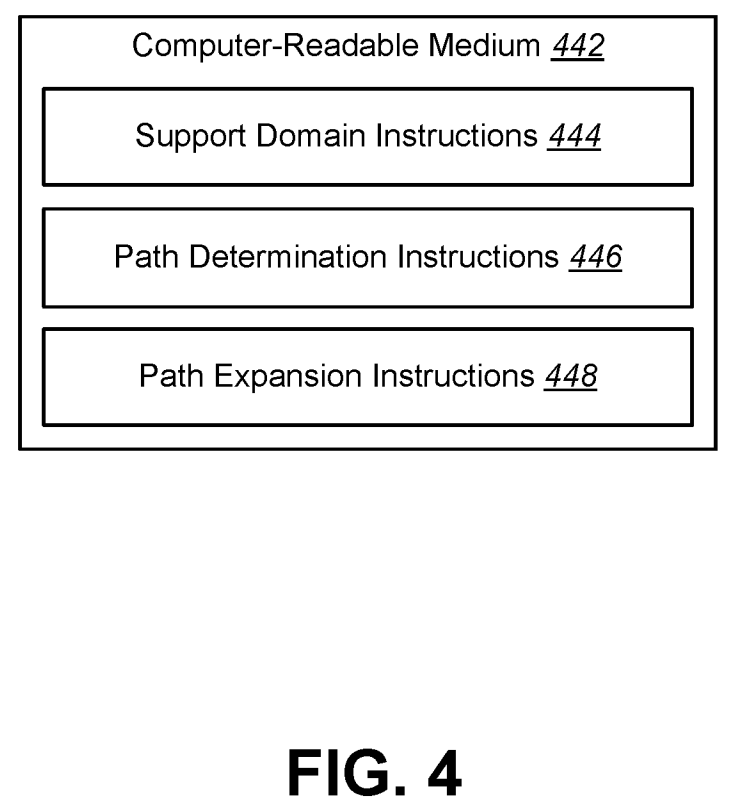

Support Domain Instructions _444_

Path Determination Instructions _446_

Path Expansion Instructions _448_

GENERATING SUPPORTS

BACKGROUND

Three-dimensional (3D) solid parts may be produced from a digital model using additive manufacturing. Additive manufacturing may be used in rapid prototyping, mold generation, mold master generation, and short-run manufacturing. Additive manufacturing involves the application of successive layers of build material. This is unlike some machining processes that often remove material to create the final part. In some additive manufacturing techniques, the build material may be cured or fused.

BRIEF DESCRIPTION OF THE DRAWINGS

FIG. 4 is a block diagram illustrating an example of a computer-readable medium for generating supports;

DETAILED DESCRIPTION

Figure 1:
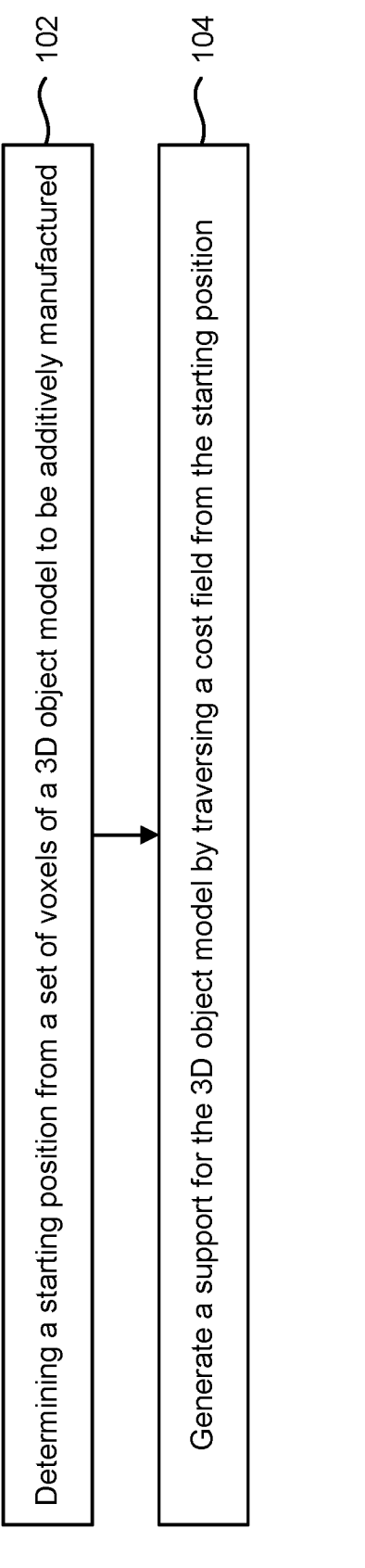
FIG. 1 is a flow diagram illustrating an example of a method for generating a support.

Additive manufacturing may be used to manufacture three-dimensional (3D) objects. 3D printing is an example of additive manufacturing. Some examples of 3D printing may selectively deposit an agent (e.g., binder) to join or fuse build material (e.g., powder).

A voxel is a representation of a location in a 3D space. For example, a voxel may represent a volume or component of a 3D space. For instance, a voxel may represent a volume that is a subset of the 3D space. In some examples, voxels may be arranged on a 3D grid. For instance, a voxel may be rectangular or cubic in shape. Examples of a voxel dimensions may be described in microns or millimeters (mm). For instance, a 3D object model or build may be described by a group of voxels of a certain size defined by a dimension. For example, a cubic voxel has equal dimensions (e.g., a 2 mm cubic voxel has a height of 2 mm, a width of 2 mm, and a depth of 2 mm). Other examples of voxel dimensions include 25.4 millimeters (mm)/150≈170 microns for 150 dots per inch (dpi), 490 microns for 50 dpi, etc. A group of voxels may be utilized to represent a build volume. A build volume is a volume or represents a volume in which an object or objects may be manufactured. A "build" may refer to an instance of 3D manufacturing.

Some challenges in 3D printing for metal object manufacturing include final object geometrical accuracy and manufacturing consistency. Some approaches to 3D printing may produce porous parts in a first stage of manufacturing. For example, the porous parts may include metal powder that is joined with binding agent. The porous parts may be sintered in a second stage of manufacturing, where the metal powder is melted and the binding agent is burned off.

Sintering can result in significant (e.g., approximately 50%) volumetric shrinkage. The shrinkage may not be isotropic, depending on non-uniform stress occurring during sintering. For example, gravitational sag may occur, where the target location a feature may be disrupted due to insufficient support. Gravitational slump may occur, where a downward flow of material occurs, thereby changing object thickness. Surface drag may occur, where distortion is caused by friction between a part and a supporting surface during movement induced by part shrinkage.

Some examples of the techniques described herein provide automated support structure generation. A support structure is a structure to support a 3D object during manufacture. For example, a support structure may be automatically generated and added to or attached to a 3D object model in order to reduce deformation (e.g., gravitational sag, gravitational slump, and/or surface drag) of the 3D object during manufacturing. The support structure may be removed after sintering and/or cooling. Some examples of the techniques may generate a support structure to support the 3D object during manufacturing with reduced material consumption. Some examples of the techniques described herein may be beneficial by automatically generating a support structure for printing.

Throughout the drawings, identical reference numbers may designate similar, but not necessarily identical, elements. Similar numbers may indicate similar elements. When an element is referred to without a reference number, this may refer to the element generally, without necessary limitation to any particular drawing figure. The drawing figures are not necessarily to scale, and the size of some parts may be exaggerated to more clearly illustrate the example shown. Moreover, the drawings provide examples and/or implementations in accordance with the description; however, the description is not limited to the examples and/or implementations provided in the drawings.

FIG. 1 is a flow diagram illustrating an example of a method 100 for generating a support. The method 100 and/or a method 100 element or elements may be performed by an apparatus (e.g., electronic device, computing device, printer, server, etc.). For example, the method 100 may be performed by the apparatus 302 described in connection with FIG. 3.

The apparatus may determine 102 a starting position from a set of voxels of a 3D object model to be additively manufactured. A 3D object model is a 3D model of an object. For example, a 3D object model may be a geometrical model of an object in three dimensions. A 3D object model may be expressed as voxels, points, polygons (e.g., tetrahedral, prisms, other unit volumes), and/or a mesh or meshes, etc., in three dimensions. Some examples of the techniques described herein may be described in relation to voxels. Other expressions of the 3D model may be utilized instead of voxels in some examples. In some examples, the apparatus may voxelize a 3D object model. For instance, the apparatus may convert a 3D object model from another representation (e.g., mesh, Computer-Aided Design (CAD) file, point cloud, etc.) to a voxel representation. In some approaches, the apparatus may receive the 3D object model from another device (e.g., server, network device, thumb drive, etc.). The 3D object model may be stored in memory. For instance, the 3D object model may be stored as a voxelized model file, where the 3D object is represented with voxels.

The 3D object model may be located in a build volume. For example, the apparatus may position the 3D object model in a build volume. For instance, voxels of the 3D object model may occupy some of the voxels in the build volume. In some examples, the build volume may include one 3D object model or multiple 3D object models. In some examples, the 3D object model may be positioned on a base or floor of the build volume. In some examples, the build volume may be represented in a 3D Cartesian coordinate system including a width axis (e.g., x axis), a depth axis (e.g., y axis) and a height axis (e.g., a z axis). The height axis may be oriented approximately vertically, the width axis may be oriented approximately horizontally, and the depth axis may be oriented approximately horizontally, where the axes may be orthogonal to each other.

A starting position or starting positions may be determined 102 from a set of voxels. The set of voxels may include all of the voxels of the 3D object model or a subset of voxels of the 3D object model. For example, the subset of voxels may include surface voxels (e.g., exterior surface voxels) and not interior voxels. In another example, the set of voxels may include voxels on a lower surface of the 3D object model. The lower surface may be an area or areas of the 3D object model that face downward. In some examples, the apparatus may determine the set of voxels by selecting voxels on a lower surface of the 3D object model that do not contact a base of the build volume. For instance, the apparatus may select each voxel of the 3D object model that does not have a neighboring voxel of the 3D object model below the voxel. For example, the selected voxels may include each voxel with a lowest z coordinate for each voxel column that intersects the 3D object model. Voxels in contact with the base of the build volume may be excluded from the set of voxels.

A starting position is a candidate position for supporting the 3D object model or a portion of the 3D object model. For example, a starting position may be a location, point, or voxel of the 3D object model where a support may be attached to the 3D object model. The apparatus may determine 102 the starting position from the set of voxels using an approach or approaches.

In some examples, determining 102 the starting position may include selecting a voxel from the set of voxels with a greatest predicted displacement. A predicted displacement is an amount of displacement (e.g., movement from a target position) predicted to occur during manufacturing (e.g., sintering, cooling, etc.). In some examples, a predicted displacement may include predicted displacements in x, y, and z directions for each vertex of each voxel or a subset of voxels of the 3D object model. For instance, each voxel of the set of voxels may have a predicted displacement. The displacement prediction may be performed by the apparatus or another device. For instance, the apparatus may receive the predicted displacements from another device (e.g., server, computer, thumb drive, etc.). The predicted displacements may be calculated using a deformation simulation, a data-driven approach, or both. The predicted displacements may indicate a predicted deformation of voxels of an unsupported 3D object model. In some examples, another starting position or positions may be determined. For instance, a filtering distance or filtering radius may be utilized to filter voxels from the set of voxels, where another starting position may be selected from the remaining voxels in the set of voxels. A filtering distance or filtering radius is a distance within which voxels may be filtered or removed. For example, the apparatus may remove, from the set of voxels, voxels that are within a filtering radius from the selected voxel. The apparatus may determine a second starting position from the set of voxels (e.g., from the set of voxels after voxels within the filtering radius are removed). For instance, the second starting position may be selected as the voxel with the greatest displacement from the remaining voxels. In some examples, the determination 102 (e.g., selection and filtering) may repeat, recur, or iterate to determine another starting position or starting positions until the set of voxels is empty or until no voxels remain from the set of voxels.

In some examples, determining 102 a starting position from the set of voxels may be accomplished by randomly selecting a voxel from the set of voxels. In some examples, determining 102 a starting position from the set of voxels may be accomplished by selecting a voxel that overhangs by a greatest distance without an underlying voxel of the 3D object model that is in contact with the voxel. In some examples, determining 102 a starting position from the set of voxels may be accomplished by selecting a voxel that is identified in a received input. In some examples, the selection may be followed by filtering using a filtering distance or filtering radius as described above. In some examples, the determination 102 (e.g., selection and filtering) may repeat, recur, or iterate to determine another starting position or starting positions until the set of voxels is empty or until no voxels remain from the set of voxels.

The apparatus may generate 104 a support for the 3D object model by traversing a cost field from the starting position. A support is a structure to support a 3D object model. For example, a support may be manufactured with a 3D object in order to support the 3D object during manufacturing. A support may be generated and/or manufactured as an appendage to a 3D object or as an attachment to (e.g., an object bound or glued to) the 3D object. In some examples, a support may be approximately columnar and/or tree-like. A support structure may include a support or supports.

A cost field is a set of values corresponding to positions (e.g., points, voxels, etc.) of a space or area. For instance, a cost field may be calculated, where each voxel in a build volume or a subset of the build volume has a corresponding value or "cost." Each value may represent a distance to a base of the build volume. In some examples, a cost field may be calculated by propagating a voxel count upward from a voxel or voxels in contact with the base of the build volume. For example, a Wavefront procedure may be utilized to calculate the cost field in some examples, the Wavefront procedure may be utilized to calculate the values using a restricted Manhattan distance from a source (e.g., bottom voxel) to a position (e.g., voxel in the build volume). For instance, a value may indicate a distance between an open position (e.g., a voxel not included in the 3D object model) and a nearest endpoint at the base of the build volume. In some examples, the Wavefront procedure may be utilized to calculate the values starting with the values of the open positions from a bottom layer, up to a highest layer. Generating 104 the support may be performed by traversing the cost field from the starting position. For instance, the cost field may indicate a direction of a shortest distance from the starting position to the base of the build volume. Generating 104 the support may include selecting voxels that will include a node based on the cost field. A node is a point or voxel of a potential support or a support. In some examples, traversing the cost field may include selecting nodes that follow a shortest distance through the cost field as indicated by the values of the cost field. In some examples, traversing the cost field may include selecting nodes that follow the shortest distance through the cost field with a constraint or constraints. A constraint is a condition to meet in selecting a node and/or a path for a support. An example of a constraint is a slope constraint. A slope constraint may dictate that a node and/or path is within a slope range. An example of a slope range is a minimum of 2 vertical voxels for each horizontal voxel. For instance, a selected node or path may descend 2 vertical voxels or more for each horizontal voxel traversed. Another example of a constraint may include a padding constraint. The padding constraint may dictate that a node or path be a minimum distance from the 3D object model. In some examples, the apparatus may generate 104 a support by traversing the cost field with a constraint or constraints. A support may track the selected node and/or path determined by traversing the cost field. In some examples, an element or elements of the method 100 may be omitted or combined.

Figure 2:
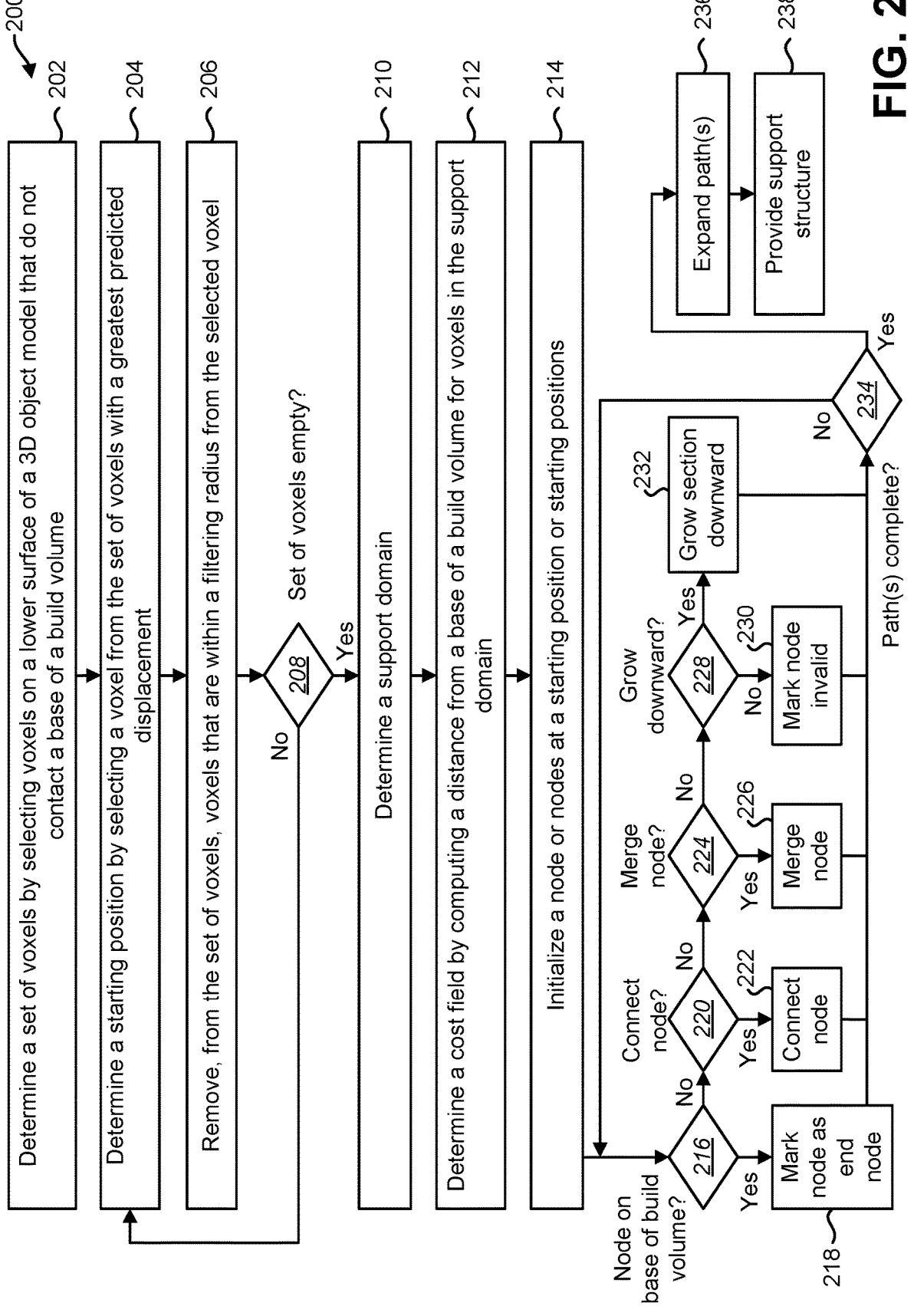
FIG. 2 is a flow diagram illustrating an example of a method for generating a support or supports.

FIG. 2 is a flow diagram illustrating an example of a method 200 for generating a support or supports. The method 200 and/or a method 200 element or elements may be performed by an apparatus (e.g., electronic device, computing device, server, etc.). For example, the method 200 may be performed by the apparatus 302 described in connection with FIG. 3. In some examples, the method 200 or element(s) thereof described in connection with FIG. 2 may be an example of the method 100 or element(s) thereof described in connection with FIG. 1. In some examples, an element or elements of the method 200 may be omitted or combined. In some examples, the method 200 may use a 3D object model, predicted displacement (e.g., a file of predicted displacements corresponding to voxels of the 3D object model), and/or a parameter or parameters. Examples of parameters may include section height, joining distance, slope constraint, section thickness, and filtering distance. A section height is a maximum height for a section of a support. A section is a part of a support. For instance, a support may be generated in sections. Joining distance is a distance within which nodes may be connected or merged. In some examples, a slope constraint may be expressed as a maximum slope from vertical. Section thickness is the thickness of a section or support. The filtering distance is a distance within which voxels may be filtered or removed (for starting positions, for example). The 3D object model, the predicted displacements, and/or the parameters may be determined by the apparatus or another device. For instance, the apparatus may receive the 3D object model, the predicted displacements, and/or the parameters from another device. In another example, the apparatus may generate the 3D object model, may calculate the predicted displacements, and/or may determine the parameters from a received input.

The apparatus may determine 202 a set of voxels by selecting voxels on a lower surface of a 3D object model that do not contact a base of a build volume. This may be accomplished as described in relation to FIG. 1.

The apparatus may determine 204 a starting position by selecting a voxel from the set of voxels with a greatest predicted displacement. This may be accomplished as described in relation to FIG. 1. In some examples, a starting position may be selected randomly, based on a greatest overhang distance, and/or based on a received input instead of based on a predicted displacement. A selected voxel may be added to a set of selected voxels in some examples. The set of voxels may be candidate voxels or examples of candidate points for starting positions. A starting position may be a potential origin for a support. In some examples, the support may be generated proceeding from a top of the support downward. A support may potentially start at a starting position at the top and follow a path down to the base of the build volume.

The apparatus may remove 206, from the set of voxels, voxels that are within a filtering radius from the selected voxel. For instance, the apparatus may remove, from the set of voxels, a voxel or voxels within a sphere having the filtering radius from the selected voxel.

The apparatus may determine 208 whether the set of voxels is empty. For example, the apparatus may determine whether all voxels have been removed from the set of voxels or whether no voxels remain in the set of voxels. In case that the set of voxels is not empty, the apparatus may return to determine 204 another starting position. For instance, a recurrent procedure may be utilized to filter voxels from the set of voxels. For example, based on the predicted displacements, a voxel with the greatest displacement may be utilized as a reference point and put in a set of starting positions. Using the filtering distance parameter, a sphere centered on the reference point may be created and all candidate voxels inside the sphere may be removed from the set of voxels. This procedure may repeat until there are no more voxels in the set of voxels, which may produce a set of starting positions. It may be beneficial to start from the greatest displacements, since the voxels with the greatest displacements may benefit from a support.

In a case that the set of voxels is empty, the apparatus may determine 210 a support domain. A support domain is a group of voxels in which a support or supports may be generated. For example, the support domain may include open positions that may be utilized to generate a support or supports. For instance, open positions may include voxels that can hold a node of a support or of the support structure. In some examples, a support domain may be determined 210 from voxels in a build volume. It may be beneficial to determine the support domain in order to reduce computation (e.g., reduce the number of voxels for cost field determination, the number of potential voxels for a support or supports, etc.).

In some examples, the apparatus may determine 210 the support domain based on a set of starting positions for the 3D object model to be manufactured. For instance, the apparatus may determine support domain width boundaries, support domain depth boundaries, and/or support domain height boundaries based on coordinates of the starting positions. In some examples, the apparatus may remove voxels of the 3D object model and/or voxels of a margin of the 3D object model from the support domain. In some examples, the support domain may be determined 210 based on a parameter or parameters.

In some examples, the boundaries of the support domain may be determined as limits in the directions of the x, y, and z axes. The position of a node may be set within the boundaries. In some examples, the support domain may be initialized as voxels inside a bounding box that is defined by minimum and maximum coordinates of the starting positions plus padding based on the section thickness. The padding may be utilized to reduce or minimize collisions between the support or supports and the 3D object model. In some examples, the padding may be expressed as half of the section thickness plus one voxel as shown in Equation (1).

$$padding = section\_thickness/2 + 1 \tag{1}$$

In some examples, the bounding box width and depth may be truncated to the corresponding dimensions of the build volume. In some examples, the height may be set to a maximum height of all starting positions. For instance, the bounding box dimensions may be set in accordance with Equations (2)-(7).

$$BoundingBox.min.x = max(bed.min.x, min(startingPositions.x) - padding) \tag{2}$$

BoundingBox.max.x=min(bed.max.x,max(starting
  Positions.x)+padding)    (3)

BoundingBox.min.y=max(bed.min.y,min(startingPo-
  sitions.y)–padding)    (4)

BoundingBox.max.y=min(bed.max.y,max(starting
  Positions.y)+padding)    (5)

BoundingBox.min.z=0    (6)

BoundingBox.max.z=max(startingPositions.z)    (7)

In Equations (2)-(7), BoundingBox.min.x is a minimum boundary of the bounding box in the x dimension, bed.min.x is a minimum position of the base of the build volume in the x dimension, BoundingBox.max.x is a maximum boundary of the bounding box in the x dimension, bed.max.x is a maximum position of the base of the build volume in the x dimension, startingPositions.x are x components of the set of starting positions, max( ) denotes a maximum operation, min( ) denotes a minimum operation, BoundingBox.min.y is a minimum boundary of the bounding box in the y dimension, bed.min.y is a minimum position of the base of the build volume in the y dimension, BoundingBox.max.y is a maximum boundary of the bounding box in the y dimension, bed.max.y is a maximum position of the base of the build volume in the y dimension, startingPositions.y are y components of the set of starting positions, BoundingBox.min.z is a minimum boundary of the bounding box in the z dimension, BoundingBox.max.z is a maximum boundary of the bounding box in the z dimension, and startingPositions.z are z components of the set of starting positions. In some examples, padding may be a non-negative constant that is relatively small compared to a 3D object model size.

In some examples, determining 210 the support domain may include removing 3D object model voxels and a margin of surrounding voxels. This may help to reduce or minimize collisions between a support and the 3D object model. In some examples, the margin may be created with a same size as the section thickness. The margin may be generated between the 3D object model and open positions (e.g., voxels) and removed from the support domain. In some examples, the margin may be generated by applying a morphological dilation with a structuring element kernel (e.g., a diamond structuring element kernel) over the 3D object model. A structuring element kernel is a shape in 1 to N dimensions (e.g., two dimensions, three dimensions, etc.). In some examples, the morphological dilation may be applied in a cross section (e.g., horizontal layer) of the 3D object model (e.g., voxelized model). The structuring element kernel may be applied by positioning the shape along the surface of the 3D object model and setting the overlapping voxels as the margin. Once the support domain is determined 210, each of the voxels in the support domain may be an open position that may potentially become a node of a support and/or support structure.

The apparatus may determine 212 a cost field by computing a distance from a base of a build volume for voxels in the support domain. This may be accomplished as described in relation to FIG. 1, where the cost field is calculated in the support domain, which may be a subset of the build volume. For instance, the Wavefront procedure may be performed for voxels in the support domain.

The apparatus may initialize 214 a node or nodes at a starting position or starting positions. Initializing 214 a node may include labeling a starting position as a node and/or including or indicating a starting position in a set of loose nodes. A loose node is a node at the bottom of a path that is not on the base of the build volume. For example, a set of loose nodes (e.g., list of loose nodes) may be initialized with the starting positions. For instance, a loose node may be a node that is not connected to another node below the position of the loose node. In some examples, loose nodes may be incrementally joined (e.g., connected or merged). As the loose nodes become joined or are above the bottom of a corresponding path, the nodes may be removed from the set of loose nodes (e.g., list of loose nodes) until there are no loose nodes remaining to evaluate.

In some examples, the apparatus may utilize hierarchical rules to produce a section or sections of a path. The hierarchical rules are rules that may be utilized to control the progression (e.g., growth) and/or termination of a path or paths through the cost field. The hierarchical rules may be ordered in accordance with a hierarchy, where a rule that is higher in the hierarchy may be evaluated before a rule that is lower in the hierarchy. The hierarchical rules may be utilized to orient the growth direction of a path. In some examples, the hierarchical rules may be utilized in accordance with a hierarchical order to avoid conflicts where two or more rules could be applied to a single loose node.

In some examples, the hierarchical rules may include an end rule, a connection rule, a merge rule, and/or a downward growth rule. For instance, the end rule may be the highest rule in the hierarchy, followed by the connection rule, followed by the merge rule, followed by the downward growth rule. In some examples, a rule or rules may be omitted or reordered in the hierarchy. In some examples, the hierarchical rules may be utilized by the apparatus as described in relation to FIG. 2. In some examples, the connection rule, merge rule, and/or downward growth rule may be utilized with the cost field to determine how a node is extended. For instance, extension may proceed in a direction of a smallest cost in the cost field for connection, merging, and/or downward growth in some approaches.

The apparatus may determine 216 whether a node is on a base of the build volume. This determination 216 may be an example of the end rule. For example, the apparatus may determine whether a node is positioned at a lowest level of the build volume or on the base of the build volume. In a case that the node is on the base of the build volume, the apparatus may mark 218 the node as an end node. For instance, the apparatus may record an indication that the node is an end node. In some examples, the node may be removed from the set of loose nodes (e.g., list of loose nodes for evaluation).

The apparatus may determine 234 whether a path or paths are complete. For example, the apparatus may determine whether any loose nodes remain in the set of loose nodes (e.g., list of loose nodes). For instance, in a case that a loose node is still in the set of loose nodes, this may indicate that a path (corresponding to a starting point, for instance) is incomplete. In a case that a path or paths are not complete, the apparatus may return to determine 216 whether a next node (e.g., a next node in the set of loose nodes) is on a base of the build volume.

In a case that a loose node (e.g., a loose node being evaluated) is not on a base of a build volume, the apparatus may determine 220 whether to connect the loose node to another node. This may be an example of the connection rule. A loose node may be connected to another node when one section is utilized to extend the path to join the loose node to the other node. For instance, the apparatus may determine whether to connect the loose node in accordance with a criterion or criteria. In some examples, to connect to a nearest node, the criteria may include that the node is within a joining distance, that a connecting section (or a section to connect the nodes) is within a slope constraint, and/or that the connecting section does not collide with the 3D object model. In some examples, the apparatus may determine whether the joining distance criterion and the slope constraint criteria are met by determining whether the nodes to be connected are both within a mask. A mask is a shape of positions or voxels that indicates a range to satisfy a criterion or criteria. In some examples, the apparatus may determine whether the connecting section would collide with the 3D object model using a ray traversal procedure. The ray traversal procedure may be utilized to create the connecting section (e.g., section of a path) from a loose node to another node and/or to test for collisions. Ray casting may be an example of the ray traversal procedure. In some examples of a ray traversal procedure, a line or lines (or voxel ray(s)) from a voxel may be utilized to determine a voxel or voxels that intersect the line(s). For instance, in a case that the connecting section overlaps with a voxel or voxels of the 3D object model, a collision may be detected. In some examples, a collision may be detected by creating a voxel ray and checking whether the voxel ray collides with the 3D object model using Boolean operations (e.g., subtraction and/or intersection).

In some examples, multiple nodes may be candidates for connection to a node (e.g., loose node) being evaluated. For instance, multiple nodes may meet the constraints (e.g., joining distance, slope constraint, no collision). When there are multiple nodes that are candidates for connection, a nearest node with the smallest cost in the cost field may be selected for connection. If the smallest costs are equal, then a node with a smallest Euclidean distance may be selected in some examples.

In a case that the apparatus determines 220 to connect the loose node, the apparatus may connect 222 the loose node to another node. For instance, in a case that the connection rule (with the corresponding criterion or criteria, for example) is satisfied, the apparatus may connect 222 the loose node. For instance, the apparatus may create a section between the loose node and another node. In some examples, the section may be created using a ray traversal procedure that indicates the voxels in the path between nodes. The apparatus may proceed to determine 234 whether the path(s) are complete.

In some examples, the apparatus may remove the node from the set of loose nodes, since the node has been connected and is no longer a loose node. For instance, once a loose node becomes connected to or merged with another node or open position below the loose node (e.g., by connecting, merging, or making a downward growth), then the loose node or nodes may be removed from the list of loose nodes. Another node of a connection may be a lower node. The other node may be a previously existing node or a new node created from an open position used in a merge or a downward extension. The other node may become a loose node (or may continue to be a loose node), so that the other node remains in the list of loose nodes to be evaluated.

The apparatus may determine 224 whether to merge the loose node with another loose node in response to determining 220 not to connect the loose node with another node. For example, in a case that the apparatus determines 220 not to connect the loose node, the apparatus may determine 224 whether to merge the loose node with another loose node. For instance, in a case that the connection rule is not satisfied (e.g., a corresponding criterion or criteria are not satisfied, for example), the apparatus may determine 224 whether to merge the loose node with another node. This may be an example of the merge rule. A loose node may be merged to another loose node when two sections are utilized to join loose nodes. For instance, the apparatus may determine whether to merge the loose node in accordance with a criterion or criteria.

In some examples, to merge with a nearest loose node, the criteria may include that there is an open position below the loose node and the nearest loose node, where the open position is within a joining distance from the loose node and from the nearest loose node, that merging sections (or sections to merge the loose nodes) are within a slope constraint, and/or that the merging sections do not collide with the 3D object model. In some examples, the apparatus may determine whether the joining distance criterion and the slope constraint criteria are met by determining whether the open position is within masks relative to the loose node and the other loose node to be merged. In some examples, the apparatus may determine whether the merging sections would collide with the 3D object model using a ray traversal procedure (as described above, for instance). The ray traversal procedure may be utilized to create the merging sections (e.g., sections of a path) from the loose node and the nearest loose node to the open position and/or to test for collisions. For instance, in a case that a merging section overlaps with a voxel or voxels of the 3D object model, a collision may be detected.

In some examples, multiple open positions may be candidates for merging nodes (e.g., loose nodes). For instance, multiple open positions may meet the constraints (e.g., joining distance, slope constraint, no collision). When there are multiple open positions that are candidates for merging, a nearest open position with the smallest cost in the cost field may be selected for merging. If the smallest costs are equal, then an open position with a smallest Euclidean distance may be selected in some examples.

In a case that the apparatus determines 220 to merge the loose node, the apparatus may merge 226 the loose node with another loose node. For instance, in a case that the merge rule (with the corresponding criterion or criteria, for example) is satisfied, the apparatus may merge 226 the loose node with another loose node. For instance, the apparatus may create a section between the loose node and the open position, and a section between the nearest loose node and the open position. In some examples, the sections may be created using a ray traversal procedure that indicates the voxels in the path between nodes. In some examples, the apparatus may create a loose node in the open position. In some examples, the apparatus may remove a node or nodes (e.g., the previously loose nodes that have been merged) from the set of loose nodes (as described herein, for instance). The apparatus may proceed to determine 234 whether the path(s) are complete.

The apparatus may determine 228 whether to grow downward in response to determining 224 not to merge the loose node with another loose node. For example, in a case that the apparatus determines 224 not to merge the loose node, the apparatus may determine 228 whether to create a section downward from the loose node. For instance, in a case that the merge rule is not satisfied (e.g., a corresponding criterion or criteria are not satisfied, for example), the apparatus may determine 228 whether to grow downward from the loose node. This may be an example of the downward growth rule. A loose node or path may be grown downward by creating a section downward from the loose node. For instance, the apparatus may determine whether to grow the loose node or path downward in accordance with a criterion or criteria.

In some examples, to grow downward from a loose node, the criteria may include that the created section does not collide with the 3D object model and/or that the created section is within the slope constraint. The created section may have a height that is less than or equal to the section height parameter. For example, if a distance to the base of the build volume is greater than the section height parameter, the apparatus may create a section with a height equal to the section height parameter. If a distance to the base of the build volume is less than the section height parameter, the apparatus may create a section with a height to extend to the base, where the height is less than the section height parameter. The downward growth may proceed toward a position of a smallest cost in the cost field.

In some examples, multiple open positions may be candidates for downward growth. For instance, multiple open positions may meet the constraints (e.g., slope constraint, no collision). When there are multiple open positions that are candidates for downward growth, a nearest open position with the smallest cost in the cost field may be selected for downward growth. If the smallest costs are equal, then an open position with a smallest Euclidean distance may be selected in some examples.

In a case that the apparatus determines 228 to grow a section downward from the loose node, the apparatus may grow 232 a section downward from the loose node. For instance, in a case that the downward growth rule (with the corresponding criterion or criteria, for example) is satisfied, the apparatus may grow 232 a section downward from the loose node. For instance, the apparatus may create a section between the loose node and an open position below the loose node. In some examples, the section may be created using a ray traversal procedure that indicates the voxels in the path below the loose node. In some examples, the apparatus may create a loose node in the open position. In some examples, the apparatus may remove a node (e.g., the previously loose node from which the section is grown) from the set of loose nodes (as described herein, for instance). The apparatus may proceed to determine 234 whether the path(s) are complete.

In a case that the apparatus determines 228 not to grow downward, the apparatus may mark 230 the loose node invalid. For instance, in a case that the downward growth rule is not satisfied (e.g., a corresponding criterion or criteria are not satisfied, for example), the apparatus may mark 230 the loose node invalid. In some examples, the apparatus may remove the node (e.g., the previously loose node that is marked invalid) from the set of loose nodes (as described herein, for instance). In some examples, information regarding all of the nodes may be stored in memory. The apparatus may remove any path(s) that have an invalid node. The apparatus may proceed to determine 234 whether the path(s) are complete.

As described above, the apparatus may determine 234 whether the path(s) are complete. For instance, the apparatus may determine 234 whether every path is complete by determining if any loose node remains in the set of loose nodes. In some examples, if the set of loose nodes is empty and/or if all loose nodes are end nodes and/or invalid nodes, the apparatus may determine 234 that the path(s) are complete.

In a case that the path(s) are complete, the apparatus may expand 236 the path(s). For example, the apparatus may expand 236 the path(s) to produce a support or supports. In some examples, the apparatus may expand each path to become a cylindrical support with thickness of the section thickness parameter. For instance, the apparatus may utilize the path(s) to generate a support structure. A support may be an expansion of a path. In some examples, the apparatus may create a voxelized cylinder from each path using voxel traversal. For instance, the apparatus may utilize a ray traversal procedure to create the voxelized support from each node to a corresponding joint. Each support may be a voxelized cylinder with a radius that is equal to half of the section thickness parameter. Expanding all of the path(s) may create the support structure.

The apparatus may provide 238 the support structure. For example, the apparatus may store the support structure in memory and/or may send the support structure to another device. For instance, the support structure may be stored and/or sent in a file. In some examples, the support structure may be added to a file including the 3D object model. For example, the apparatus may provide a model file that includes the original voxelized 3D object model file with the support structure added and exported as a surface mesh. The model file may be a 3D-printable document or documents. In some examples, the apparatus may provide a volumetric model file, which may be a representation of the voxelized 3D object model with the support structure including vertices, voxels, and material properties used for deformation prediction. In some examples, the apparatus may provide a boundary conditions file, which may be a file with a list of the vertex indexes that are on the base of the build volume.

In some examples, the apparatus may be a computing device that sends the support structure to a printer or another computing device. For instance, the apparatus may provide the support structure to another device over a network, such as a local area network (LAN) and/or the Internet).

In some examples, the apparatus may be a printer (e.g., 3D metal printer). The apparatus may print the 3D object with the support structure. For example, the apparatus may layer metal powder and print agent on the layers of metal powder in a build volume based on the provided support structure. In some examples, an operation or operations of the method 200 may be omitted, combined, or reordered.

Figure 3:
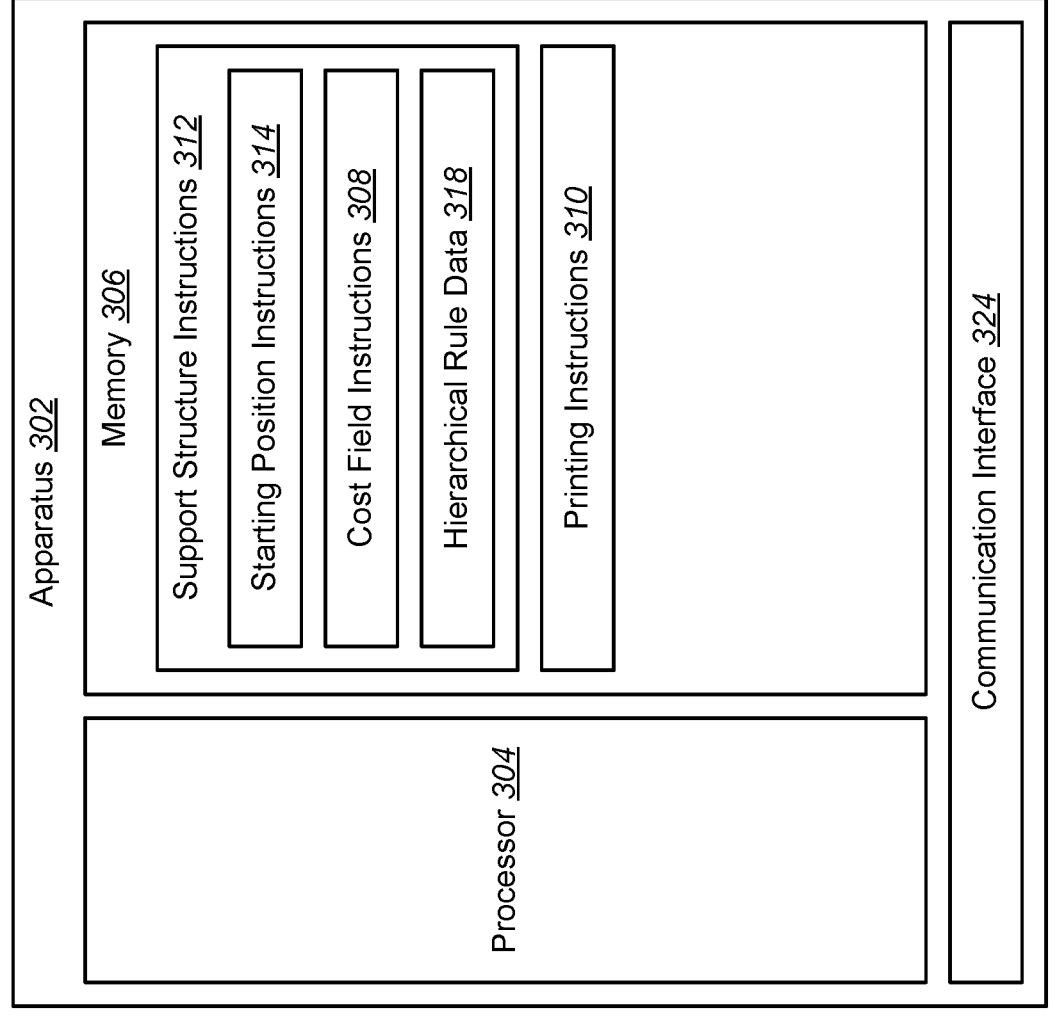
FIG. 3 is a block diagram of an example of an apparatus that may be used in generating supports.

FIG. 3 is a block diagram of an example of an apparatus 302 that may be used in generating supports. The apparatus 302 may be an electronic device, such as a printer, personal computer, a server computer, a laptop computer, a smartphone, a tablet computer, etc. The apparatus 302 may include and/or may be coupled to a processor 304 and/or a memory 306. The apparatus 302 may include additional components (not shown) and/or some of the components described herein may be removed and/or modified without departing from the scope of this disclosure.

The processor 304 may be any of a central processing unit (CPU), a digital signal processor (DSP), a semiconductor-based microprocessor, graphics processing unit (GPU), field-programmable gate array (FPGA), an application-specific integrated circuit (ASIC), and/or other hardware device suitable for retrieval and execution of instructions stored in the memory 306. In some examples, the processor 304 may include multiple processors (e.g., a CPU and a GPU). The processor 304 may fetch, decode, and/or execute instructions stored in the memory 306. In some examples, the processor 304 may include an electronic circuit or circuits that include electronic components for performing a function or functions of the instructions. In some examples, the processor 304 may be implemented to perform one, some, or all of the functions, operations, elements, methods, etc., described in connection with one, some, or all of FIGS. 1-7.

The memory 306 may be any electronic, magnetic, optical, or other physical storage device that contains or stores electronic information (e.g., instructions and/or data). The memory 306 may be, for example, Random Access Memory (RAM), Electrically Erasable Programmable Read-Only Memory (EEPROM), a storage device, an optical disc, and/or the like. In some examples, the memory 306 may be volatile and/or non-volatile memory, such as Dynamic Random Access Memory (DRAM), EEPROM, magnetoresistive random-access memory (MRAM), phase change RAM (PCRAM), memristor, flash memory, and/or the like. In some implementations, the memory 306 may be a non-transitory tangible machine-readable storage medium, where the term "non-transitory" does not encompass transitory propagating signals. In some examples, the memory 306 may include multiple devices (e.g., a RAM card and a solid-state drive (SSD)).

In some examples, the apparatus 302 may include a communication interface 324 through which the processor 304 may communicate with an external device or devices. In some examples, the apparatus 302 may be in communication with (e.g., coupled to, have a communication link with) a remote device via a network. Examples of the remote device may include printers (e.g., 3D printers, metal jet printers, etc.), computing devices, desktop computers, laptop computers, smart phones, tablet devices, etc. Examples of the network may include a local area network (LAN), wide area network (WAN), the Internet, cellular network, Long Term Evolution (LTE) network, 5G network, etc.

The communication interface 324 may include hardware and/or machine-readable instructions to enable the processor 304 to communicate with the remote device or devices. The communication interface 324 may enable a wired and/or wireless connection to the external device or devices. In some examples, the communication interface 324 may include a network interface card and/or may also include hardware and/or machine-readable instructions to enable the processor 304 to communicate with various input and/or output devices, such as a keyboard, a mouse, a display, another apparatus, electronic device, computing device, etc., through which a user may input instructions and/or data (e.g., parameters) into the apparatus 302. In some examples, the memory 306 of the apparatus 302 may store support structure instructions 312 and/or printing instructions 310. In some examples, the support structure instructions 312 may include starting position instructions 314, cost field instructions 308, and/or hierarchical rule data 318.

In some examples, the processor 304 may execute the starting position instructions 314 to generate a support structure for a 3D object model. For example, the processor 304 may execute the starting position instructions 314 to initialize a node at a starting positing on a 3D object model to be printed. This may be accomplished as described in relation to FIG. 2.

In some examples, the processor 304 may execute the cost field instructions 308 to traverse a cost field from the starting position using hierarchical rules to produce a section or sections (e.g., path(s)). The section or sections (e.g., path(s)) may be utilized (e.g., expanded) to produce a support or supports. Producing section(s) and/or support(s) may be accomplished as described in relation to FIG. 2.

In some examples, the hierarchical rules may be stored as hierarchical rule data 318. For example, the hierarchical rules may include a connection rule, a merge rule, and/or a downward growth rule. In some examples, the processor 304 may connect the node to a nearest node using the connection rule in a case that the nearest node is within a joining distance, that a connecting section is within a slope constraint, and that the connecting section does not collide with the 3D object model.

In some examples, the processor 304 may execute the printing instructions 310 to print a 3D object with a support structure based on the section(s). For instance, the support structure may include a support or supports produced from the section(s). The support structure may be printed with the 3D object in order to support the 3D object during manufacture. For instance, the apparatus 302 may be a computing device that may send the support structure to a 3D printer for printing. In some examples, the apparatus 302 may be a 3D printer and may include (not shown in FIG. 3) a build volume, a print head or print heads, and/or mechanical actuators. The apparatus 302 may control the print heads to print agent on metal powder in the locations of the build volume indicated by the support structure and the 3D object model. The support structure may support the printed 3D object during manufacture. The support structure may be later removed from the 3D object.

In some examples, the processor 304 may produce a user interface. A user interface is an interactive graphic or image. For example, a user interface may be a graphical user interface (GUI) with controls, fields, etc., that may enable interaction between a user and a device. The user interface may be produced to enable a user to input a parameter or parameters. For instance, the apparatus 302 may include (not shown) a display and/or may be linked to a display. In some examples, the processor 304 may produce a user interface, which may be presented on the display. In some examples, the processor 304 may produce a user interface for a remote device. For instance, the apparatus 302 may send data (e.g., web page data) to present the user interface remotely.

In some examples, a user may interact with a user interface by using an input device or devices. For example, the apparatus 302 or a remote device on which a user interface is presented may include and/or may be linked to an input device or devices. Examples of input devices include a mouse, touch screen, controller, touch pad, stylus, microphone, camera, etc. For instance, the apparatus 302 or remote device on which a user interface is presented may receive input from the input device that indicates a parameter or parameters for cost field traversal and/or support generation.

FIG. 4 is a block diagram illustrating an example of a computer-readable medium 442 for generating supports. The computer-readable medium is a non-transitory, tangible computer-readable medium 442. The computer-readable medium 442 may be, for example, RAM, EEPROM, a storage device, an optical disc, and the like. In some examples, the computer-readable medium 442 may be volatile and/or non-volatile memory, such as DRAM, EEPROM, MRAM, PCRAM, memristor, flash memory, and the like. In some implementations, the memory 306 described in connection with FIG. 3 may be an example of the computer-readable medium 442 described in connection with FIG. 4.

The computer-readable medium 442 may include code (e.g., data and/or instructions). In some examples, the code may include executable code. For example, the computer-readable medium 442 may include support domain instructions 444, path determination instructions 446, and/or path expansion instructions 448.

The support domain instructions 444 include code to cause a processor to determine a support domain based on a set of starting positions for a 3D object model to be manufactured. This may be accomplished as described above. For instance, the support domain instructions 444 may include code to cause the processor to determine support domain width, depth, and height boundaries based on coordinates of the starting positions. In some examples, the support domain instructions 444 may include code to cause the processor to remove voxels of the 3D object model and a margin of the 3D object model from the support domain.

The path determination instructions 446 may include code to cause a processor to determine a path based on the support domain and a cost field. This may be accomplished as described above. For example, the processor may determine a path by traversing the cost field in the support domain in a direction of a shortest distance to a base of a build volume indicated by the cost field in accordance with a constraint or constraints.

The path expansion instructions 448 may include code to cause a processor to expand the path to produce a support for the 3D object model. This may be accomplished as described above. For instance, the processor may expand the path to a support (e.g., column, cylindrical support, etc.). Expanding the path may include adding voxels to the path.

Figure 5:
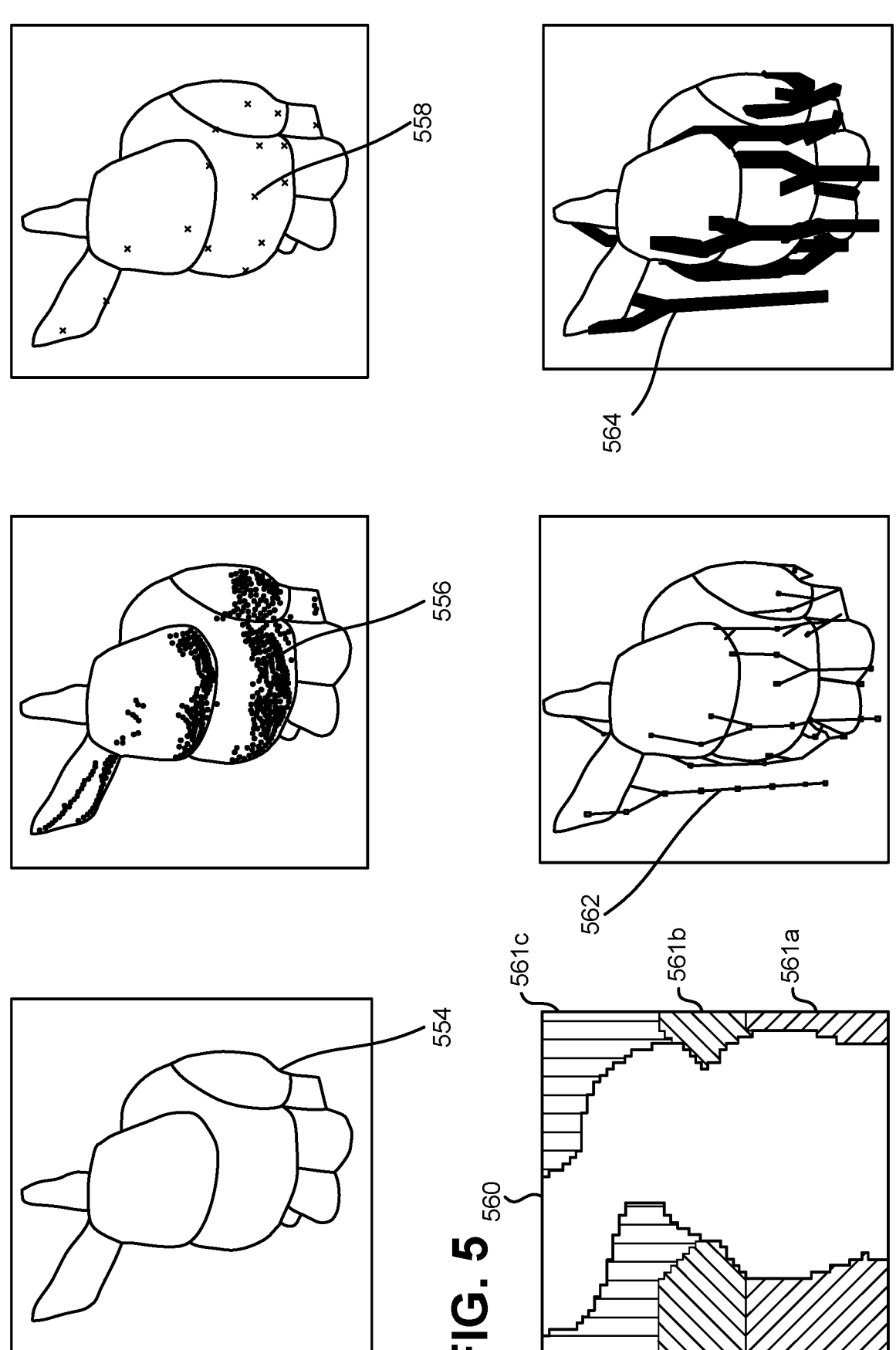
FIG. 5 is a diagram illustrating an example of a 3D object model for which a support structure may be generated in accordance with some examples of the techniques described herein.

FIG. 5 is a diagram illustrating an example of a 3D object model 554 for which a support structure may be generated in accordance with some examples of the techniques described herein. For example, FIG. 5 illustrates a set of voxels 556 from which a set of starting positions 558 may be selected. The voxels in the set of voxels 556 are shown as dots in the top center illustration. Starting positions in the set of starting positions 558 are shown as crosses in the top right illustration. FIG. 5 also illustrates an example of a cost field 560 that may be traversed to produce paths 562. For simplicity in illustration, the values in the cost field 560 are shown as ranges, where a first range 561*a* includes values from 0-21, a second range 561*b* includes values from 22-35, and a third range 561*c* includes values from 36-76. The paths 562 may be expanded to produce supports 564 of a support structure.

Figure 6:
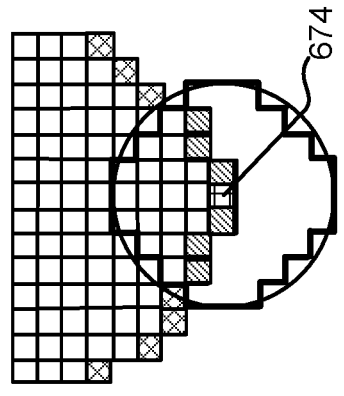
FIG. 6 is a diagram illustrating examples of parameters in accordance with some examples of the techniques described herein.
Figure 6:
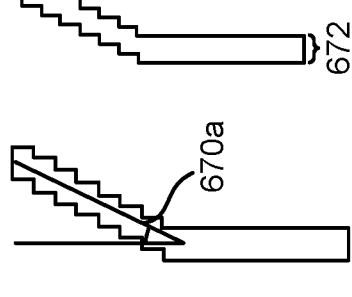
Figure 6:
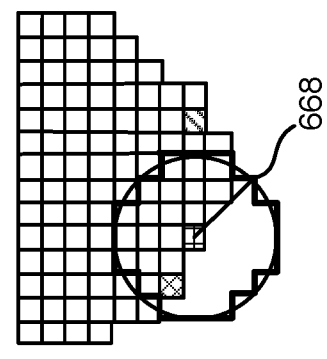
Figure 6:
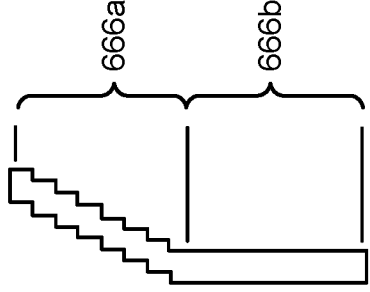
Figure 6:
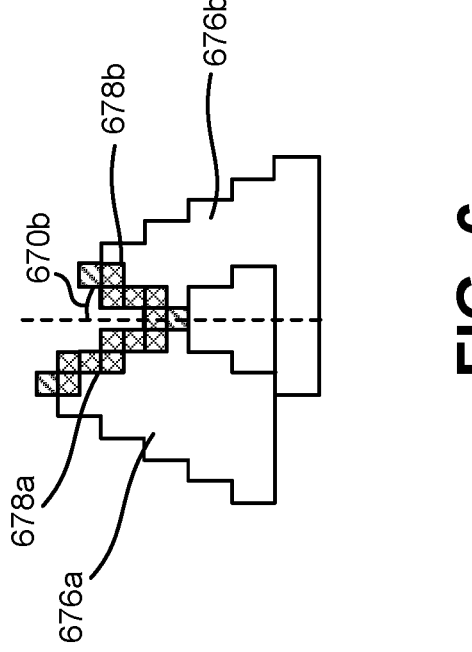

FIG. 6 is a diagram illustrating examples of parameters in accordance with some examples of the techniques described herein. For example, FIG. 6 illustrates examples of section heights 666*a-b*, joining distance 668, slope constraints 670*a-b*, section thickness 672, and filtering distance 674. FIG. 6 also illustrates examples of masks 676*a-b* to determine to merge nodes to an open position with sections 678*a-b*. In some examples, the joining distance 668 may include voxels within a radius or voxel offset from a center voxel. For instance, a first loose node within the joining distance may be considered for joining, whereas a loose node outside of the joining distance may not be considered for joining. In some examples, the slope constraints 670*a-b* may be expressed as an angle from vertical and/or a ratio (e.g., rise/run). In some examples, the filtering distance 674 may include voxels within a radius or voxel offset from a center voxel. For instance, voxels in the set of voxels that are within the filtering distance 674 may be removed from consideration as a potential starting point.

Figure 7:
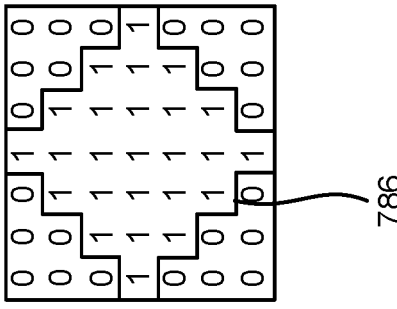
FIG. 7 is a diagram illustrating an example of applying a structuring element kernel.
Figure 7:
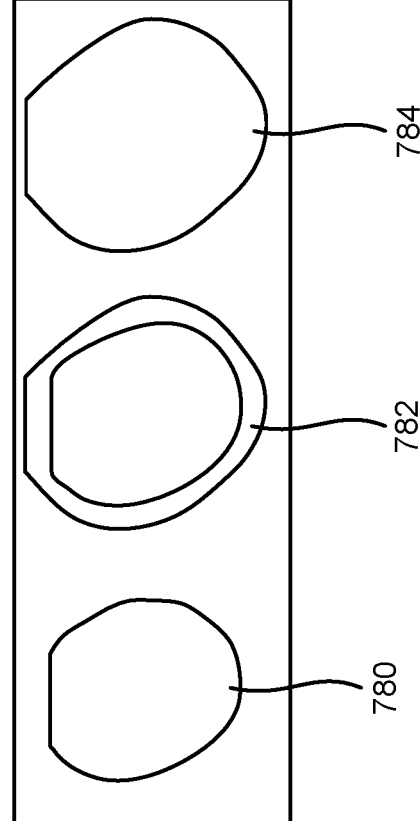

FIG. 7 is a diagram illustrating an example of applying a structuring element kernel 786. For example, a diamond structuring element kernel 786 may be applied by positioning the shape along (e.g., around) the surface of a 3D object model 780 to produce a margin 782. A combination 784 of the 3D object model 780 and the margin 782 is also illustrated in FIG. 7.

Some examples of the techniques described herein may provide automatic generation of support structures that can be applied either as built-in support to a 3D object model or attached to the 3D object model. Some examples of the support structure may be generated based on geometry and/or predicted deformation. In some examples, the geometry may be parameterized by geometrical attributes (e.g., overhanging angle) extracted from a surface mesh representation of the 3D object. In some examples, geometrical attributes or parameters may be utilized to describe the support (e.g., tree and/or truss) structure. Examples of parameters may include section angle, thickness, maximum distance to merge sections, etc. These parameters may allow generation of different support structures to fit different deformation mitigation targets.

In some examples, the predicted deformation may be a prediction of deformation due to sintering if the 3D object model were not supported during manufacturing. In some examples, deformation prediction may be accomplished through simulation and/or machine learning.

In some examples, a voxel data structure may be utilized to describe support geometry. The voxel data structure may be utilized to discretize and evolve the geometry of the support structure. Some of the techniques described herein are based on the voxel data structure. Other forms of volumetric discretization of the support structure may be utilized. For example, some of the techniques described herein may be utilized with a 3D object model partitioned using tetrahedrons, prisms, and/or other types of unit volumes. Some examples of the techniques described herein may be beneficial for the following reasons. A cost-based approach may be utilized to grow the support(s) from the starting position(s), by determining the path(s) of support(s) from a starting position(s) to the base (e.g., floor) of the build volume. Criteria may be provided to orient the directions of growth for each node of the support graph. Some examples may utilize predicted deformation to compute starting positions to generate the support structure.

While various examples of systems and methods are described herein, the systems and methods are not limited to the examples. Variations of the examples described herein may be implemented within the scope of the disclosure. For example, operations, functions, aspects, or elements of the examples described herein may be reordered, omitted, and/or combined.

The invention claimed is:

1. A method comprising:

determining, by a processor, a set of starting position candidate voxels, as a subset of voxels of a three-dimensional (3D) object model for an object to be additively manufactured, wherein the subset includes the voxels of the 3D object model that are to be supported by one or more support structures during additive manufacture of the object, and each starting position candidate voxel has a predicted displacement during additive manufacture;

culling, by the processor, the set of starting position candidate voxels by performing a process, such that the starting position candidate voxels that remain in the set after culling constitute starting position voxels, wherein the process comprises iteratively removing any starting position candidate voxel from the set that is within a filtering radius of the starting position candidate voxel that has not been processed and that has a greatest predicted displacement, until no starting position candidate voxel remains in the set that has not been processed;

generating, by the processor, the one or more support structures by traversing a cost field from the starting position voxels; and manufacturing the object with the generated one or more support structures.

2. The method of claim 1, wherein the voxels of the subset are on a lower surface of the 3D object model and do not contact a base of a build volume.

3. The method of claim 1, further comprising:

determining, by the processor, a support domain of voxels in a build volume.

4. The method of claim 3, further comprising:

determining, by the processor, the cost field by computing a distance from a base of the build volume for the voxels in the support domain.

5. The method of claim 1, wherein generating the one or more support structures comprises initializing a first node at each first starting position voxel.

6. The method of claim 5, further comprising:

determining, by the processor, whether to connect the first node with a second node.

7. The method of claim 6, further comprising:

determining, by the processor, whether to merge the first node with the second node in response to determining not to connect the first node with the second node.

8. The method of claim 7, wherein determining whether to merge the first node with the second node comprises:

determining whether an open position below the first node and the second node is within a joining distance;

determining whether merging sections are within a slope constraint; and determining whether the merging sections do not collide with the 3D object model.

9. A non-transitory machine-readable medium storing program code executable by a processor to perform processing comprising:

determining a set of starting position candidate voxels, as a subset of voxels of a three-dimensional (3D) object model for an object to be additively manufactured, wherein the subset includes the voxels of the 3D object model that are to be supported by one or more support structures during additive manufacture of the object, and each starting position candidate voxel has a predicted displacement during additive manufacture;

culling the set of starting position candidate voxels by performing a process, such that the starting position candidate voxels that remain in the set after culling constitute starting position voxels, wherein the process comprises iteratively removing any starting position candidate voxel from the set that is within a filtering radius of the starting position candidate voxel that has not been processed and that has a greatest predicted displacement, until no starting position candidate voxel remains in the set that has not been processed;

generating the one or more support structures by traversing a cost field from the starting position voxels; and causing the object to be additively manufactured with the generated one or more support structures.

10. The non-transitory machine-readable medium of claim 9, wherein the voxels of the subset are on a lower surface of the 3D object model and do not contact a base of a build volume.

11. The non-transitory machine-readable medium of claim 9, wherein the processing further comprises:

determining a support domain of voxels in a build volume; and determining the cost field by computing a distance from a base of the build volume for the voxels in the support domain.

12. The non-transitory machine-readable medium of claim 9, wherein generating the one or more support structures comprises initializing a first node at each starting position voxel, and the processing further comprises:

determining whether to connect the first node with a second node;

determining whether to merge the first node with the second node in response to determining not to connect the first node with the second node.

13. The non-transitory machine-readable medium of claim 12, wherein determining whether to merge the first node with the second node comprises:

determining whether an open position below the first node and the second node is within a joining distance;

determining whether merging sections are within a slope constraint; and determining whether the merging sections do not collide with the 3D object model.

14. An apparatus comprising:

a processor; and a memory storing program code executable by the processor to perform processing comprising:

determining a set of starting position candidate voxels, as a subset of voxels of a three-dimensional (3D) object model for an object to be additively manufactured, wherein the subset includes the voxels of the 3D object model that are to be supported by one or more support structures during additive manufacture of the object, and each starting position candidate voxel has a predicted displacement during additive manufacture;

culling the set of starting position candidate voxels by performing a process, such that the starting position candidate voxels that remain in the set after culling constitute starting position voxels, wherein the process comprises iteratively removing any starting position candidate voxel from the set that is within a filtering radius of the starting position candidate voxel that has not been processed and that has a greatest predicted displacement, until no starting position candidate voxel remains in the set that has not been processed;

generating the one or more support structures by traversing a cost field from the starting position voxels; and causing the object to be additively manufactured with the generated one or more support structures.

15. The apparatus of claim 14, wherein the voxels of the subset are on a lower surface of the 3D object model and do not contact a base of a build volume.

16. The apparatus of claim 14, wherein the processing further comprises:

determining a support domain of voxels in a build volume; and determining the cost field by computing a distance from a base of the build volume for the voxels in the support domain.

17. The apparatus of claim 14, wherein generating the one or more support structures comprises initializing a first node at each starting position voxel, and the processing further comprises:

determining whether to connect the first node with a second node;

determining whether to merge the first node with the second node in response to determining not to connect the first node with the second node.

18. The apparatus of claim 17, wherein determining whether to merge the first node with the second node comprises:

determining whether an open position below the first node and the second node is within a joining distance;

determining whether merging sections are within a slope constraint; and determining whether the merging sections do not collide with the 3D object model.

* * * * *